United States Patent [19]

Rowan, Jr.

[11] Patent Number: 5,393,165
[45] Date of Patent: Feb. 28, 1995

[54] ANCHOR BOLT REPAIR COUPLING WITH PRELOADING JACK AND EPOXY INJECTION

[76] Inventor: Robert L. Rowan, Jr., 3239 Ella Lee La., Houston, Tex. 77019

[21] Appl. No.: 943,290

[22] Filed: Sep. 10, 1992

Related U.S. Application Data

[63] Continuation-in-part of Ser. No. 605,241, Oct. 29, 1990, Pat. No. 5,163,775.

[51] Int. Cl.⁶ .................................................. F16B 7/04
[52] U.S. Cl. ................................. 403/301; 403/314; 403/362; 403/369
[58] Field of Search ............... 403/301, 300, 305, 306, 403/308, 309, 310, 313, 314, 362, 369–371, 16, 31, 265; 49/267, 268, 266, 265, 433; 52/707, 704, 726.1, 726.3

[56] References Cited

U.S. PATENT DOCUMENTS

| | | | |
|---|---|---|---|
| 1,177,869 | 4/1916 | Kelley | 403/301 |
| 1,429,263 | 9/1922 | Wolfe | 403/301 |
| 2,233,794 | 3/1941 | Noble | 24/126 |
| 3,085,306 | 4/1963 | Drysdale | 24/126 |
| 3,743,333 | 7/1973 | Kosinski | 287/52.08 |
| 4,176,981 | 12/1979 | Clapper et al. | 403/31 |
| 4,257,714 | 3/1981 | Hankosky et al. | 403/31 |
| 4,362,421 | 12/1982 | Kelly | 403/369 |
| 4,388,014 | 6/1983 | Wlodkowski et al. | 403/369 |
| 4,627,212 | 12/1986 | Yee | 52/726.1 |
| 4,666,326 | 5/1987 | Hope | 403/265 X |
| 4,850,777 | 7/1989 | Lawrence et al. | 411/433 |
| 5,046,878 | 9/1991 | Young | 403/265 X |

FOREIGN PATENT DOCUMENTS

| 1209891 | 10/1970 | United Kingdom. | |
| 2034857 | 6/1980 | United Kingdom | 52/726.1 |

OTHER PUBLICATIONS

"How to Repair a Broken Anchor Bolt", Data Sheet #200, Sep., 1988, Robert L. Rowan & Assoc., Inc.
"Anchor Bolts", Grouting Technology Newsletter, 1987, Robert L. Rowan & Assoc., Inc.

*Primary Examiner*—Randolph A. Reese
*Assistant Examiner*—Harry C. Kim
*Attorney, Agent, or Firm*—Fish & Richardson

[57] ABSTRACT

An improved device for repairing failed anchor members that hold machinery to foundations is provided. An anchor bolt repair coupling engages a failed anchor member through the use of grips, a preloading jack, and epoxy injection to facilitate the repair of the failed member.

31 Claims, 7 Drawing Sheets

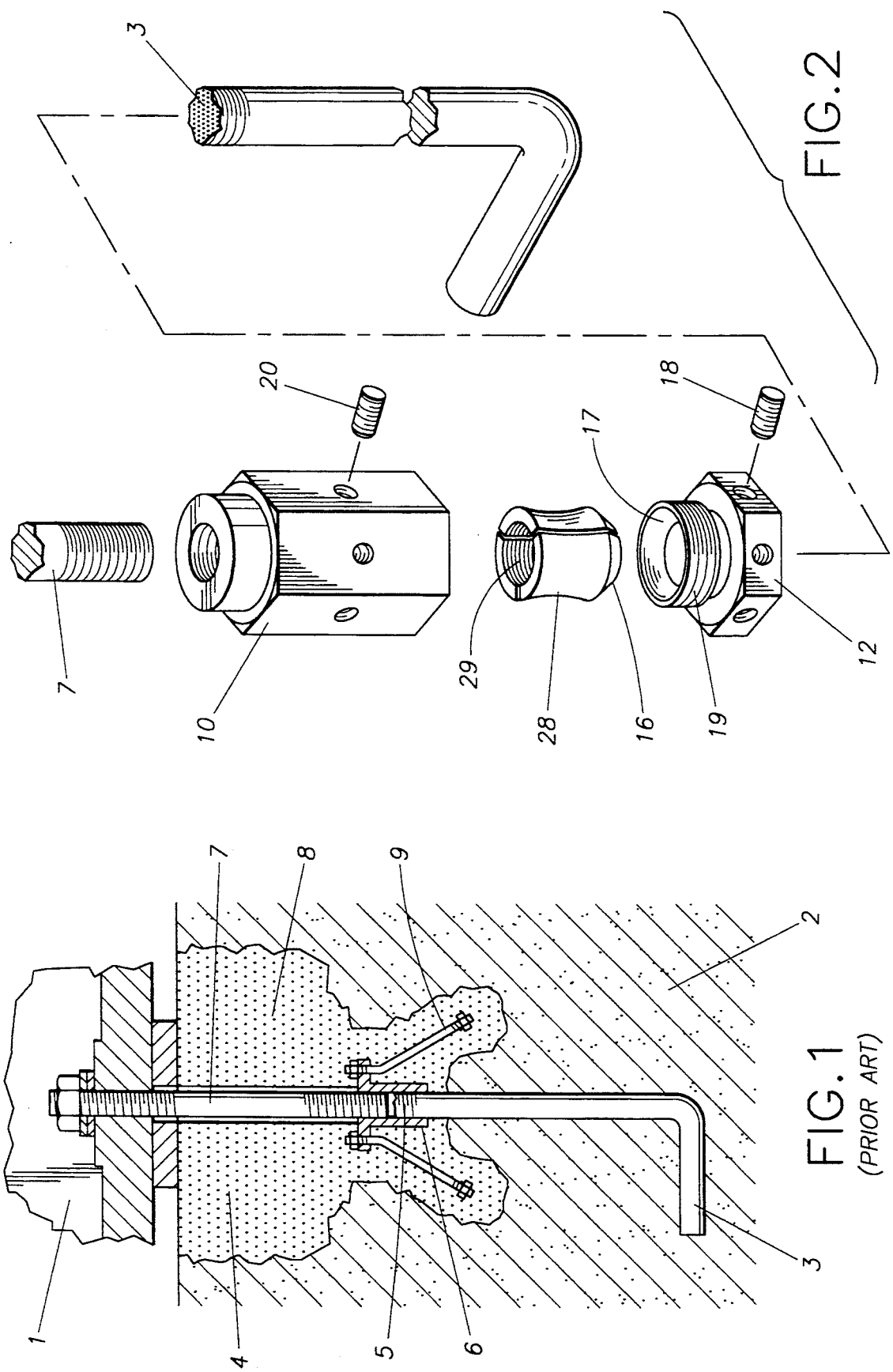

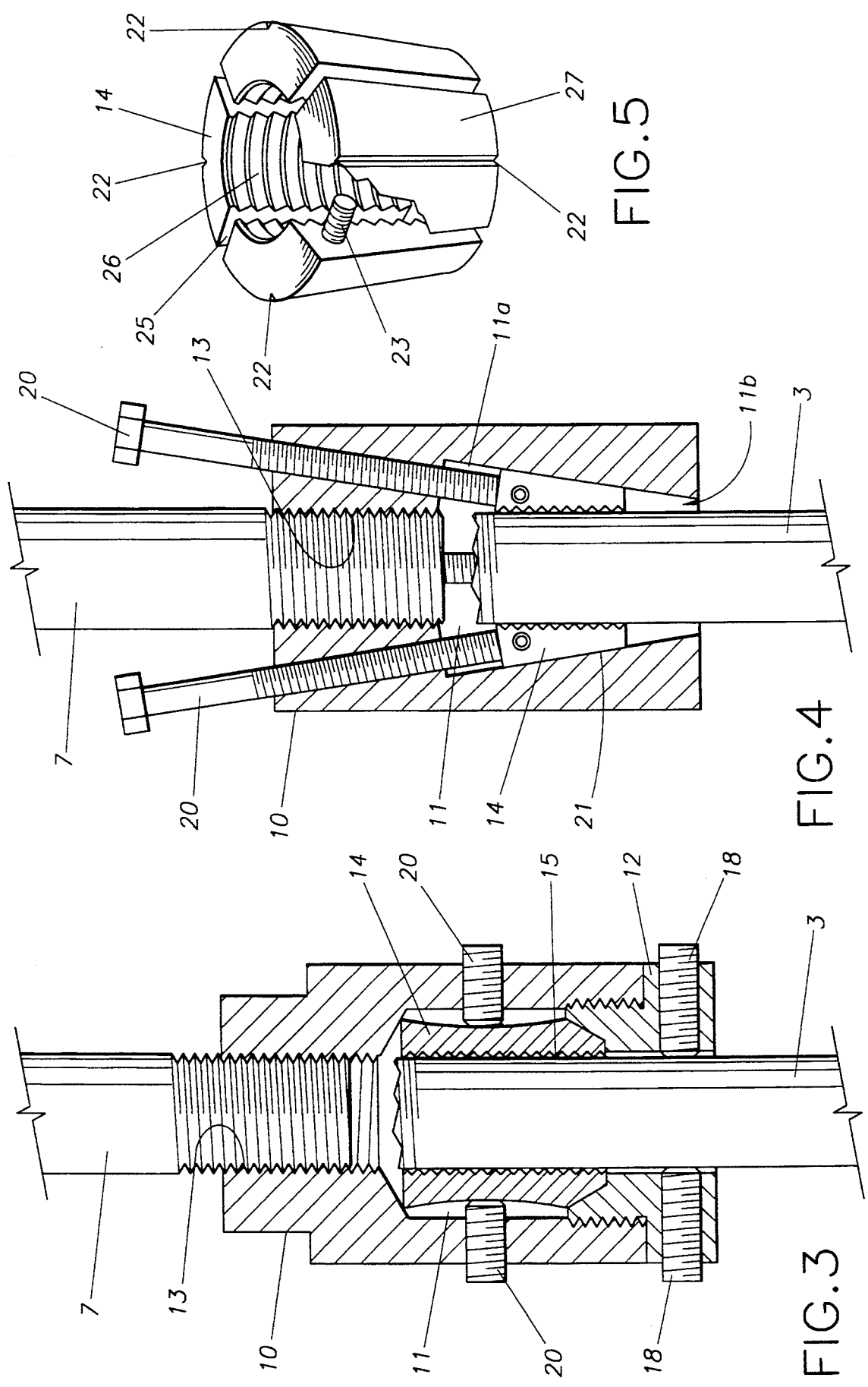

ANCHOR BOLT REPAIR COUPLING WITH PRELOADING JACK AND EPOXY INJECTION

This application is a continuation-in-part of application Ser. No. 07/605,241, filed Oct. 29, 1990, entitled ANCHOR BOLT REPAIR COUPLING, now U.S. Pat. No. 5,163,775.

BACKGROUND OF THE INVENTION

1. Field of the Invention

The present invention relates generally to an improved device for repairing broken anchoring members, and more specifically relates to an improved coupling for repairing broken anchor bolts for holding stationary machinery in place.

2. Description of the Related Art

It is common in the industry to anchor stationary machinery such as pumps, compressors, reciprocating engines, and the like to a foundation using anchoring bolts. Typically, the bolts or studs are set in the foundation and have threaded portions that extend above the foundation to facilitate anchoring of the stationary machinery thereto. However, as those skilled in the art will appreciate, a threaded anchor bolt is a complex piece of machinery in its own right and is subject to a number of complex failure modes.

Bolted fasteners, such as threaded anchor bolts, are prone to failure from overtorquing, undertorquing, fatigue loading, impact loading, ductile overloading, corrosion, metallurgical abnormalities, and loss of preload, to name just a few. Thus, it is often necessary to repair anchor bolts that have failed in service.

Several methods and devices have been developed for repairing broken anchor bolts. Among the prior art solutions, welding has been the least successful. Typically, to weld repair an anchor member, the foundation must first be chipped away from the area adjacent the fracture surface of the anchor member. The fracture surface is then usually ground flat or completely removed by saw cutting. Next, a new section of anchor member, e.g., threaded stud, is welded to the still-embedded failed anchor member. Weld repairing of failed anchor members has been successful in those few cases where the anchor member material is readily weldable, and where the strength requirements of the anchor member are minimal. Weld repairing will typically not be successful on high strength anchor members such as those fabricated from the low alloy 4100 and 4300 series steels, or from high alloy steels. Also, as will be recognized by those skilled in the art, welding produces many microvoids that can serve as fracture initiation sites and lead to the premature failure of the repaired anchor member.

Another prior art method of repairing failed anchor members is that of field threading. To repair a failed anchor member by field threading, the foundation surrounding the failed member must be chipped away to allow a sufficient work space in which to cut threads on the failed member. Typically the chipped out hole should be at least ten to twelve times the anchor member diameter in depth. The fractured anchor member is then cut off two to three inches above the bottom of the chipped out hole. A thread cutting die or similar tool is then used to cut threads onto the failed anchor member. Once the threads have been cut on the fractured anchor member, a coupling nut can be threaded onto the member. Thereafter, a new section of anchor member is screwed into the top of the coupling and extends above the foundation base. After aligning the new section of anchoring member, the chipped out hole is typically filled with epoxy or other suitable grout. The prior art practice of field thread repairing a failed anchor member is time consuming, difficult and prone to failure. Thus, there is a need in the industry, appreciated by those skilled in the art, for a new way of repairing broken anchor bolt members.

The present invention is directed to providing an improved device for repairing broken anchor members which does not require the time consuming, difficult and failure prone practices of weld repairing or field thread repairing. Accordingly, the present invention provides a new anchor bolt repair coupling that overcomes the deficiencies of the prior art.

SUMMARY OF THE INVENTION

In one aspect of the present invention, a repair coupling is provided having a base with an internal chamber open at one end and a threaded portion at the other end for receiving a threaded member. A preloading jack is provided to preload the repair coupling to a predetermined load. Grips are located in the internal chamber for gripping an anchor member and a means for engaging the grips against the anchor member is also provided.

In another embodiment, a repair coupling is provided having an injector port for injecting epoxy or other hardening compound into the internal chamber of the repair coupling. A seal means is also provided to retard the hardening compound from leaking out.

A still further embodiment provides a method for repairing a failed anchor member by removing foundation surrounding the failed member, removing all but a short stub of the exposed anchor member, activating a preloading jack to preload the repair coupling, and engaging grips in a repair coupling against the failed member.

BRIEF DESCRIPTION OF THE DRAWINGS

FIG. 1 shows a prior art solution for repairing failed anchor bolts.

FIG. 2 shows an exploded view of a two-piece anchor bolt repair coupling according to the present invention.

FIG. 3 shows a longitudinal cross-sectional view of a failed anchor bolt repaired with the two-piece coupling of FIG. 2.

FIG. 4 shows a longitudinal cross-sectional view of a one-piece anchor bolt repair coupling according to the present invention.

FIG. 5 shows a set of grips used with the repair coupling of FIG. 4.

DETAILED DESCRIPTION OF A PREFERRED EMBODIMENT

Figures 6, 7:
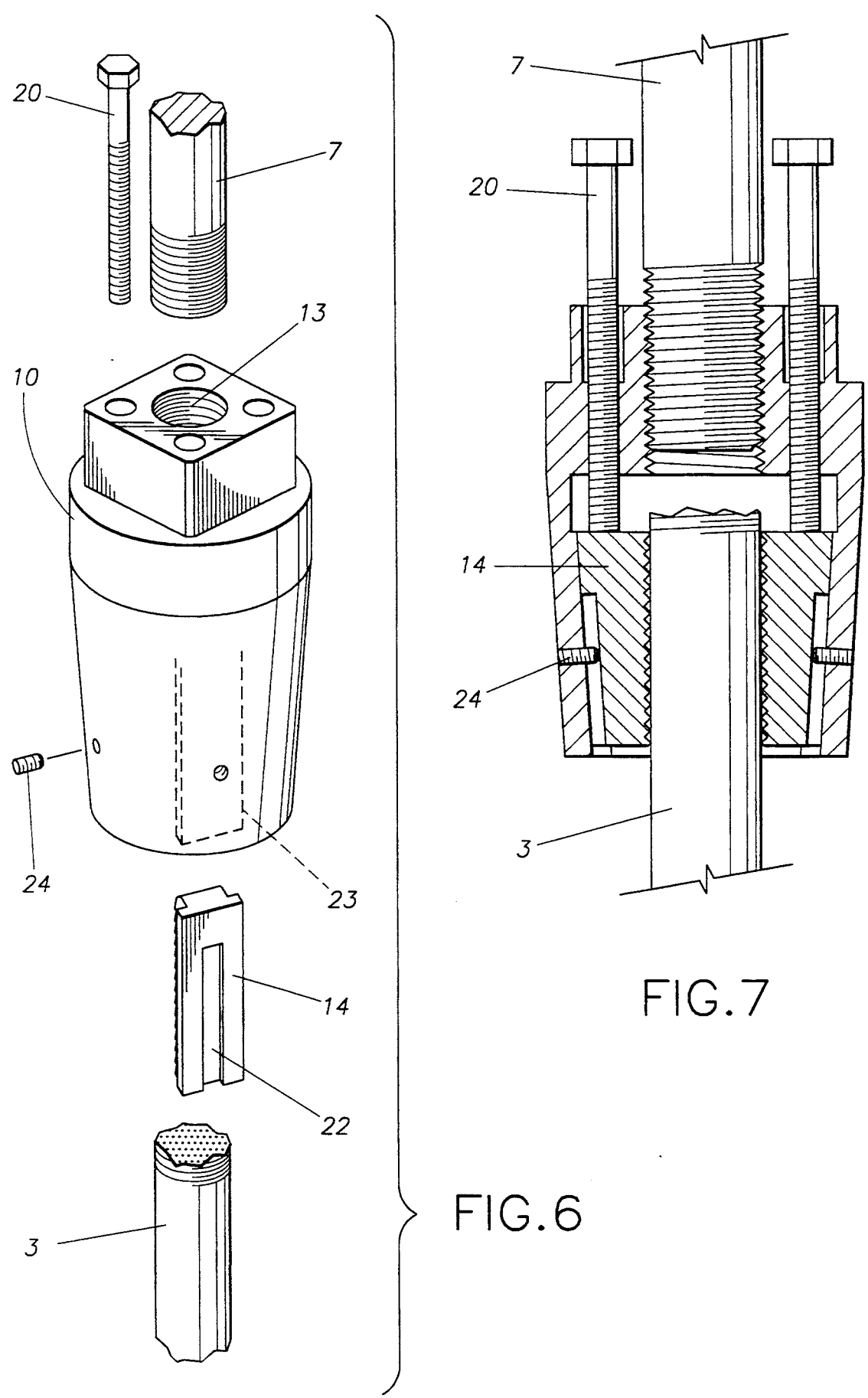
FIG. 6 shows an exploded view of an alternate one-piece anchor bolt repair coupling according to the present invention.
FIG. 7 shows a longitudinal cross-sectional view of the repair coupling shown in FIG. 6.

FIG. 1 is an illustration of one of the more successful prior art solutions for repairing a failed anchor member used to hold stationary machinery to a foundation. As can be seen from FIG. 1, stationary machinery 1 is anchored to an existing foundation 2 by an original anchor bolt 3. At a point in time prior to the failure of anchor bolt 3, the anchor bolt 3 extended above the foundation and facilitated the anchoring of the machinery 1 thereto. At some time during the service life of the anchor bolt 3, a failure, such as a fatigue fracture, occurred and compromised the integrity of the anchor system. It then became necessary to repair the fractured anchor member 3. The prior art solution illustrated in FIG. 1 required that foundation 2 be chipped out around the fractured bolt, leaving a chipped out region 4. The chipped out region was typically 10 to 12 times the anchor member diameter in depth. The failed anchor member 3 was then saw cut approximately 3 to 4 inches above the bottom of the chipped out region 4. The 3 to 4 inches of exposed, failed anchor member was then threaded using a thread cutting die. This threaded portion 5 is indicated in FIG. 1. An internally threaded coupling 6 was then screwed onto the cut threads 5 on the original anchor member 3 for a distance sufficient to develop full strength of the threaded joint. A replacement anchor member 7 was then threaded into the opposite end of the coupling 6 for a distance sufficient to develop the full strength of the threaded joint. The chipped out region was then filled with repair epoxy 8 or a similar grouting medium. The replacement anchor member 7 was then positioned for proper alignment with the machinery 1.

If the failure mode of the original anchor member 3 was due to insufficient strength of the original anchor member 3, the prior art repair may have included secondary anchoring members 9 emanating from the coupling 6 for additional strength.

The present invention overcomes the many disadvantages enumerated above of the prior art. FIG. 2 and FIG. 3 show a two-piece embodiment of the present invention. The anchor bolt repair coupling consists of substantially cylindrical body 10. In FIG. 2, the body 10 is shown to have been fabricated from hexagonal stock. The body 10 has an internal grip chamber 11 (shown in FIG. 3) into which the failed anchor member 3 extends. The body 10 also consists of a cap 12. The cap can be joined to the bottom of the body 10 by conventional means of fastening such as threading. At the end of the body opposite the cap, the body 10 has threads for receiving the replacement anchor member 7. The anchor bolt repair coupling of FIGS. 2 and 3 also consists of a set of grips 14. The grip set shown in FIGS. 2 and 3 consist of three individual grips in total. Each grip is curved about a longitudinal axis and forms basically one-third of a circle. Each grip is also curved about an axis passing through its mid-length and substantially perpendicular to the longitudinal axis. The curvature about the perpendicular axis is only exhibited on the outside surface 28 of the grip. The inside diameter 29 of each grip 14 has serrated edges or teeth 15 for gripping the failed anchor member 3. While FIGS. 2 and 3 reveal serrations or teeth for gripping, those skilled in the art will appreciate that any roughened surface capable of forcefully engaging the failed anchor member will suffice. Each grip also has a chamfered area 16 at one end of the grip for engaging a corresponding chamfered area 17 of the cap 12.

In practice, the foundation 2 surrounding the failed anchor member 3 is chipped out sufficiently to provide clearance to install the anchor bolt repair coupling shown in FIGS. 2 and 3. The failed anchor member 3 is then saw cut or torch cut approximately 3 to 4 inches from the bottom of the chipped out region 4. The cap 12 is then placed around the failed anchor member 3 as shown in FIG. 3. Set screws 18 are then threaded into the cap for fixedly engaging the cap 12 against the fractured anchor member 3. Next, the grips 14 are placed around the extending portion of the failed anchor member 3 such that the chamfered region 16 on grips 14 mates with the chamfered region 17 of the cap 12. A rubber band or other similar spacing means such as tape can be used to hold the grips 14 against the fractured anchor member 3 during the repair procedure. Once the grips 14 are in place, the body 10 is then screwed onto the cap threads 19. Once the body 10 has been screwed onto cap 12, engaging means 20, here, set screws, are threaded through the body 10 to engage the outer curved diameter surface of grips 14. The engaging means 20 are used to forcefully engage the grips 14 against the failed anchor member 3. Once the engaging means 20 have been set and the grips 14 are forcefully engaged against the failed anchor member 3, the replacement anchor member 7 may be threaded into the upper end of the body 10 at threads 13. It will be appreciated by those skilled in the art that engaging means 20 can also be used to align replacement anchor member 7.

Alternatively, the cap 12 can be loosely attached to the body 10 prior to positioning on the failed anchor member 3. The grips 14 are first placed inside the chamber 11 and may be held in position by a suitable spacing means (not shown) such as foam strips or a foam plug. The cap 12 is then loosely attached to the body 10 by cap threads 19. The combined cap/body/grip assembly is then positioned on the failed anchor member 3 such that the anchor member 3 passes through the cap 12 and into the internal chamber 11 where it is contacted by the grips 14. The cap 12 is securely fastened to the body 10 by tightening against the cap threads 19. This tightening causes the chamfered area 16 on the grips to engage chamfered area 17 on the cap 12 and forces the grips against the failed anchor member 3. The cap set screws 18 facilitate the tightening by the use of a pry bar or the like. Once the cap/body has been securely fastened together, the engaging means 20 can be set to forcefully engage the grips against the failed member 3. Next, the cap set screws 18 can be engaged against the failed member 3. The replacement anchor member 7 is then threaded into threads 13 and the chipped out region 4 filled with suitable material after the replacement member 7 has been aligned.

FIGS. 4 and 5 describe the preferred embodiment of the invention. FIGS. 4 and 5 show an anchor bolt repair coupling body 10 of substantially cylindrical cross-section, a failed anchor member 3, grips 14, engaging means 20, and replacement anchor member 7. The coupling body 10 is seen to have an internal grip chamber 11 which has a greater diameter toward the top of the chamber 11a as opposed to the diameter at the bottom of the chamber 11b. In other words, the internal chamber is tapered from top to bottom. A grip set 25 as shown in FIG. 5 is composed in the preferred embodiment of four individual grips 14 which comprise basically one-quarter of a circle each. The inside diameter surface of the grips are serrated or teethed 26 for forcefully engaging the failed anchor member 3. The outside diameter surface 27 of the grip is tapered corresponding to the taper of the internal chamber 11 as shown in FIG. 4. The grip set 25 also includes a spacing means 23, in this case a girder spring, for holding the grip set in position during repair. Foam strips or inserts are also suitable spacing means for positioning and locating the grips.

In practice, the grip set 25 is loaded into the internal grip chamber such that tapered surface 27 mates with tapered surface 21 of the repair coupling body 10. The coupling body 10 with grip set 25 is then lowered onto the failed anchor member 3. Engaging means 20 are then activated, in this case screwed, against the top surface of each individual grip 14, thereby forcing each individual grip lower and lower (or the body higher) into the internal passageway which, because of the internal tapered surface 21, causes an increasing gripping force to be exerted by the grips against the failed anchor member 3. While the engaging means 20 are substantially parallel to the longitudinal axis of the failed member 3, they are canted at an acute angle to the longitudinal axis to facilitate their activation. Once the grips have been forced into position by engaging means 20, the replacement anchor member 7 may be threaded into threads 13 in the top of the coupling body 10. Those skilled in the art will recognize the utility of using rolled threads for all threaded connections in order to achieve maximum service life, and will again appreciate that engaging means 20 may also be used to align replacement anchor member 7. It will also be appreciated that secondary anchoring members 9 may be used with the present invention to increase the strength of the repaired anchor member.

The engaging means 20 is disclosed to be individual threaded members that contact the grips 14. The engaging means 20 can also be a cylindrical ring (not shown) that engages the top of each grip concurrently and is activated (i.e., forced downward against the grips) by a threaded member or other suitable device such as a hydraulic or pneumatic actuator.

Referring specifically to FIG. 5, the preferred embodiment of the grip set 25 includes grips 14 with a notch 22 that describes a predetermined fracture path. Typically, the notch 22 will take the form of a V-notch or other type of stress concentration area running the longitudinal length of the mid-width of the grip 14. When the grip set is used on a failed anchor member 3 of relatively small diameter the force applied by the engaging means 20 can cause each individual grip 14 to fracture or deform along the notch 22, thus creating in effect multiple the original number of grips. Preferably, the grips are fabricated from alloy steel and heat treated to a hardness level greater than that of the failed anchor member. In most cases this requires a Rockwell hardness greater than 35 HRC. The grips may alternatively be cast and include surface hardening treatments. The present invention may also be used with grips that are as hard or softer than the failed anchor member.

FIGS. 6 and 7 show various modifications to the preferred embodiment shown in FIGS. 4 and 5. As can be seen from FIGS. 6 and 7, the engaging means 20 are aligned substantially parallel to the anchor member axis. The spacing means 23 in FIG. 6 is shown to be individual T-slots for each individual grip 14. Moreover, the notch 22 in each grip 14 does not extend all the way from the bottom of the grip to the top of the grip on the outside surface. This discontinuous notch allows the use of pins 24 in the T-slot to prevent the grip 14 from falling out of the coupling body member 10 during the repair procedure.

Figure 8:
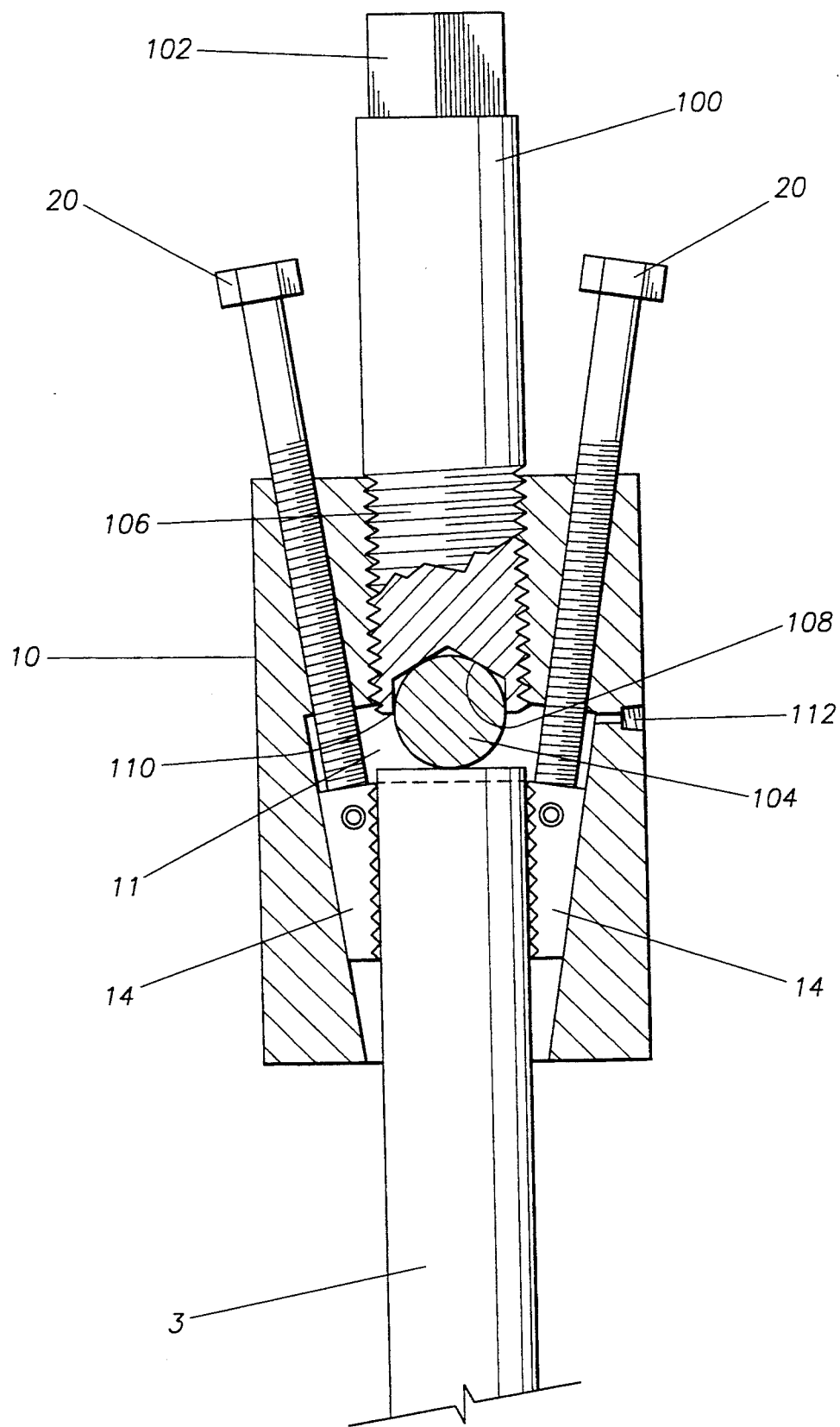
FIG. 8 shows a longitudinal cross-sectional view of the improved repair coupling with preloading jack and injection port.

FIG. 8 shows, in cross-section, several improvements of the present invention. As can be seen in FIG. 8, a preloading jack 100 is shown having wrench lands 102 at one end and a hardened ball or jacking surface 104 at the other end. Jack 100 is also seen to include threads 106 adjacent the end containing the hardened ball 104.

In the preferred embodiment of the jack, the hardened ball 104 is placed within a recess 108 formed in jack 100. It is not absolutely necessary that hardened ball 104 be able to rotate within recess 108, although this is preferable. Jack end 110 may be indented to securely hold hardened ball 104 within the recess 108. In alternate embodiments, jacking surface 104 may be a chamfered or rounded surface on the end of jack 100. (See FIGS. 8a and 8b)

In use, after the anchor bolt repair coupling 10 has been placed over fractured anchor member 3, jack 100 (with jacking surface 104) is screwed down into contact with the end surface of fractured anchor bolt 3. By utilizing a wrench upon wrench lands 102, or other torque supplying device, the reaction of jacking surface 104 against fractured anchor bolt 3 will cause the repair coupling body 10 to move in the direction of jack 100 and thereby cause grips 14 to become increasingly engaged into failed anchor bolt 3.

It will be appreciated by those of ordinary skill in the art having benefit of this disclosure that there are a variety of techniques available to determine the amount of axial load being applied to failed anchor bolt 3 and anchor bolt repair coupling 10 by use of the jack 100. Once the jack 100 has preloaded the anchor bolt repair coupling assembly to a predetermined level (typically in excess of the maximum load level anticipated during use), engaging means 20 can be activated to hold grips 14 in place.

Although engaging means 20 can be used to preload the failed anchor bolt/anchor bolt repair coupling assembly, they can also be used merely to hold the grips 14 in position after the assembly has been preloaded by jack 100. In the embodiment of the present invention using the jack 100, it is preferred that the engaging means 20 be used in this latter manner. Several structures different from those disclosed above are available as engaging means. For example, springs can also be used as engaging means.

Once the engaging means 20 have been activated against grips 14, jack 100 may be removed from the anchor bolt repair coupling 10. Once removed, replacement anchor member 7 can be inserted into the anchor bolt repair coupling. Thus, the present invention allows a failed anchor bolt to be repaired in such a manner as to eliminate, as much as possible, the majority of displacement or "slip" realized when replacement anchor member 7 is loaded and used in service.

In an alternate embodiment, jack 100 is also the replacement anchor member 7. In other words, in an alternate embodiment of the present invention, replacement anchor member 7 has a jacking surface 104 of the type previously described on one end. The opposite end of the replacement anchor member/jack comprises wrench lands 102 or other suitable structure for transferring a force couple to the replacement member. Alternatively, the wrench lands 102 can be located anywhere along the length of the replacement anchor/jack so long as the wrench lands or other structure does not interfere with the structural life of the replacement anchor member/jack.

In this alternate embodiment, after the anchor bolt repair coupling 10 has been placed over the fractured anchor bolt 3, the replacement anchor member/jack can be used as disclosed above to preload the grips against the fractured anchor bolt 3. Once the assembly is preloaded, engaging means 20 are activated to hold the grips in the preloaded condition. The replacement anchor member/jack can then be released from the preloaded condition, or it can be maintained in the preloaded condition throughout the service life of the anchor bolt repair coupling.

Also shown in FIG. 8 is injector port 112. In the preferred embodiment, injector port 112 provides fluid communication between the internal grip chamber 11 and the outside surface of the anchor bolt repair coupling 10. Injector port 112 will typically include threads near the outside surface of anchor bolt repair coupling 10 in order to facilitate attachment of an injector (not shown). After jack 100 (or replacement anchor member/jack) has been used to preload the anchor bolt repair coupling assembly to the predetermined level, and after replacement anchor member 7 has been inserted into anchor bolt repair coupling 10, the injector port 112 is utilized to inject a suitable high strength epoxy or other hardening compound into internal grip chamber 11. The injection of the epoxy into internal grip chamber 11 enhances the ability of engaging means 20 to prevent grips 14 from loosening or backing out of the pre-loaded engagement during use of the anchor bolt repair coupling 10. Hardening compounds such as Ceil-Cote 647 R by Master Builder have proven acceptable to work with the present invention.

Those of ordinary skill in the art having benefit of this disclosure will appreciate that the present invention may be utilized without engaging means. In this embodiment, the preloaded repair coupling assembly will tend to remain in the preloaded condition until the repaired anchor bolt is put back into service because of friction and the preload. Additionally, the hardening compound can be utilized as describe above to maintain the repair coupling assembly in preloaded condition without the benefit of engaging means.

It will be appreciated by those of ordinary skill in the art having benefit of this disclosure that alternating or fatigue loading of the anchor repair coupling can cause the relaxation of the preload. The injected epoxy reduces the likelihood of the loss of this preload. It will also be appreciated by those of ordinary skill in the art having benefit of this disclosure that injector port 112 and the injected epoxy can also be used with the invention disclosed above in FIGS. 2-7. In other words, the injector port 112 and injected epoxy do not have to be utilized with a jack 100, but can also be utilized when the engaging means 20 are used as the preloading means.

The injector (not shown) which communicates with injector port 112 will preferably be a one-way valve. In other words, the injector (not shown) will allow the epoxy or other hardening material to be injected into the internal grip chamber 11, but not allow the injected epoxy to leak out through the injector port 112. It will also be understood that such one-way valving mechanism may be internal to the wall of the anchor bolt repair coupling 10.

Figure 8A:
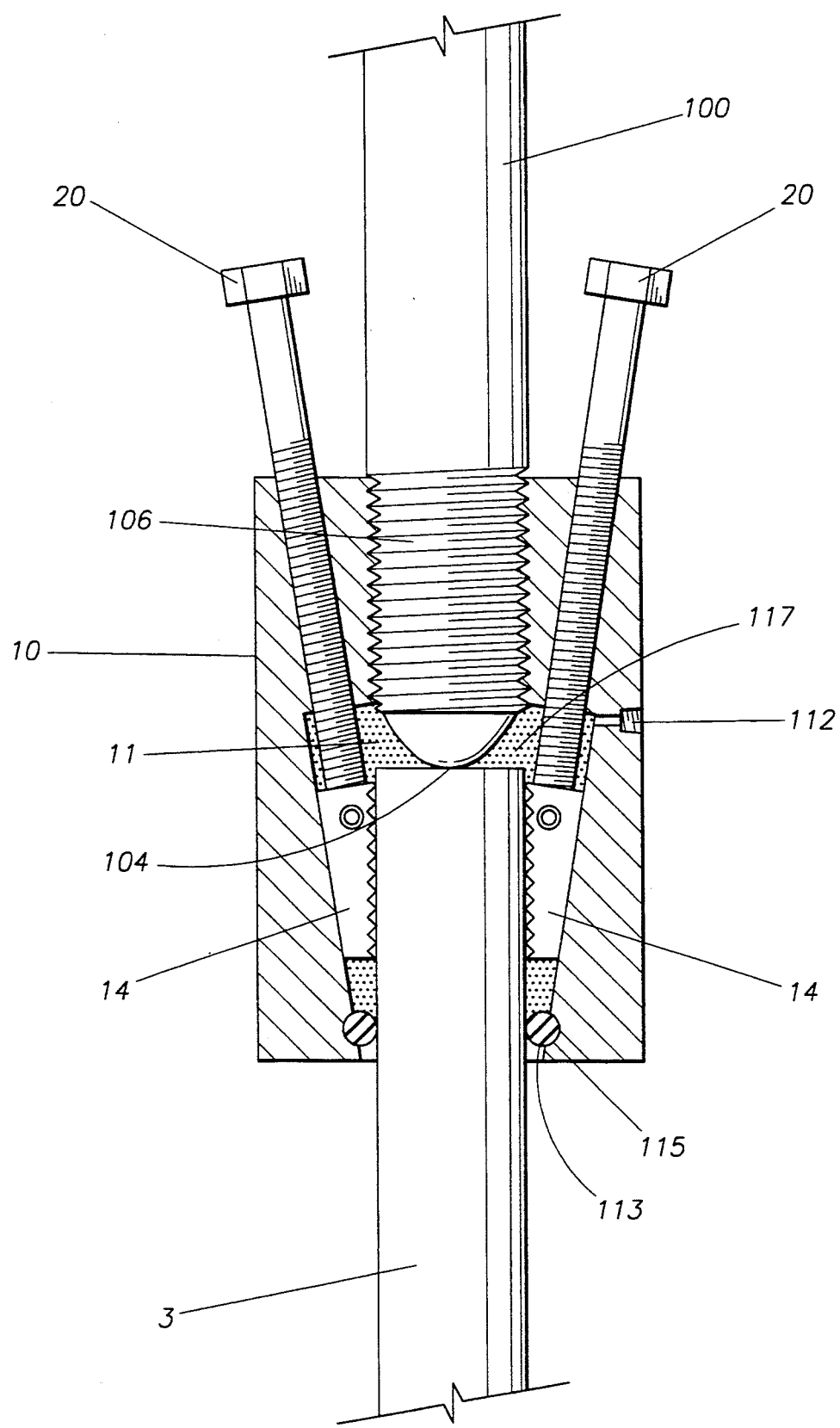
FIG. 8a shows the improved repair coupling with an O-ring seal.
Figure 8B:
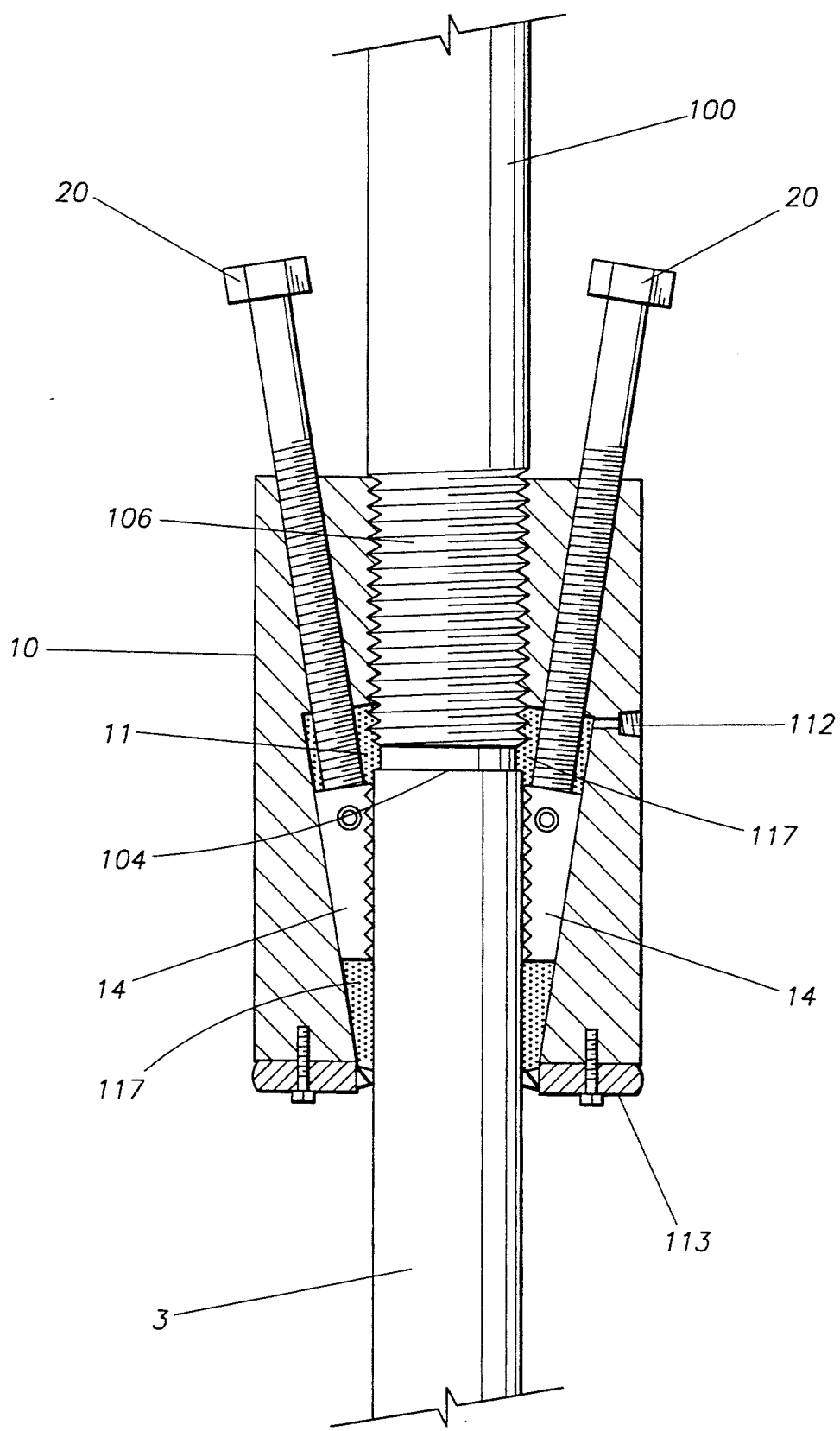
FIG. 8b shows the improved repair coupling with an alternative seal.

FIGS. 8a and 8b show a sealing means 113 disposed below the grips 14. In FIG. 8a, the sealing means is shown to be a conventional elastomeric O-ring that is located in a groove 115 formed in the anchor bolt repair coupling wall. The sealing means 113 prevents or retards the injected epoxy 117 (or other hardening compound) from leaking out of the anchor bolt repair coupling. In FIG. 8b, the sealing means 113 is shown to be a separate sealing apparatus that can be attached to the bottom of the anchor bolt repair coupling 10. The sealing means 113 can even be located above the grips 14. The sealing means can also consist of a plurality of seals for preventing the hardening compound from leaking downward onto the failed anchor member and also from leaking upwards onto the replacement anchor member and/or engaging means. There are a variety of other structures presently available to those of ordinary skill in the art having benefit of this disclosure for effecting the described sealing function of sealing means 113.

Figure 9:
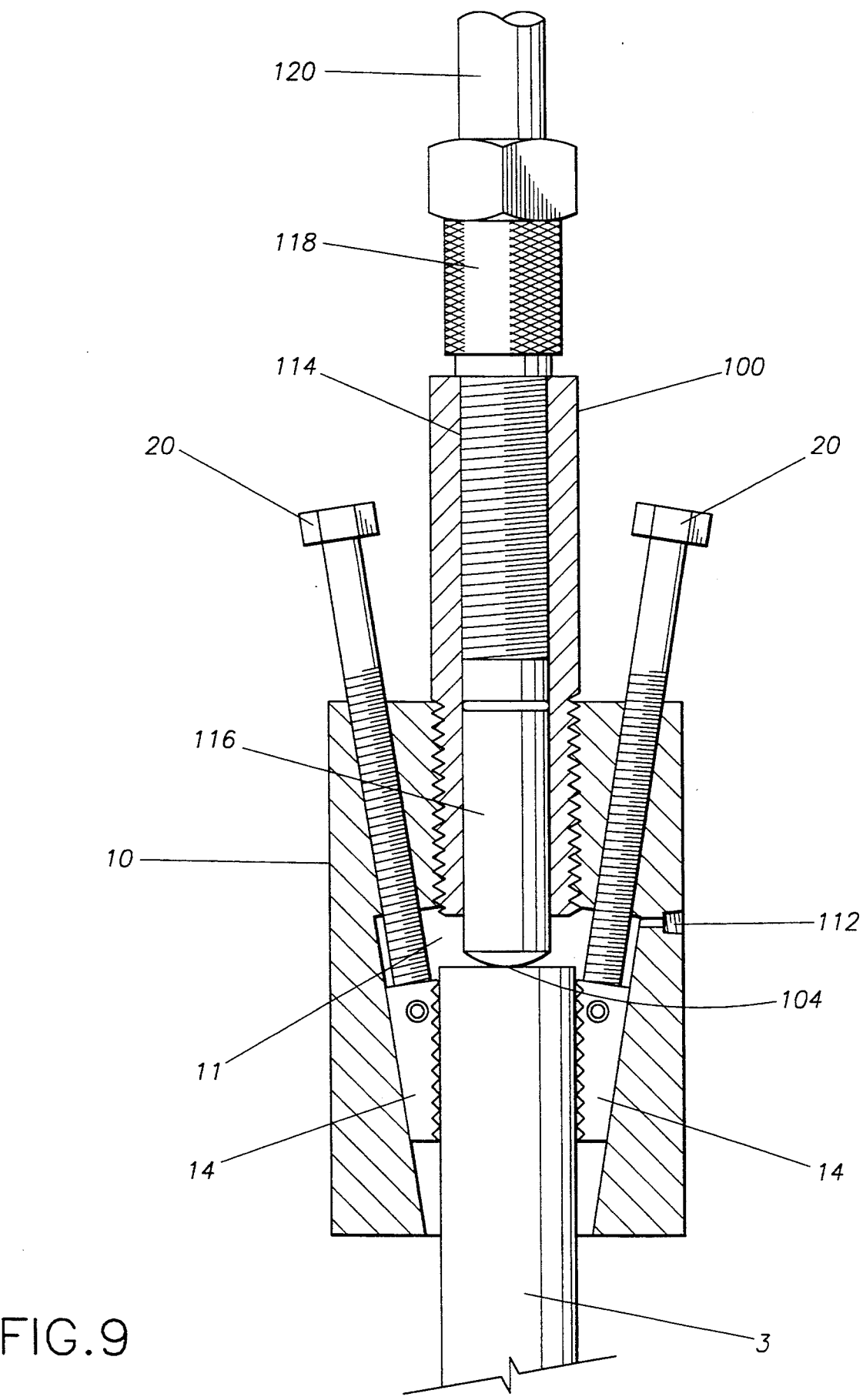
FIG. 9 shows an alternate embodiment of the preloading jack shown in FIG. 8.

In FIG. 9, removable jack 100 is shown to be a hydraulic cylinder 114 with piston 116. A jacking surface 104 is shown adjacent piston 116. Hydraulic cylinder 114 has external threads for engaging the internal threads in anchor bolt repair coupling 10. The jack 100 is also shown to have a quick-disconnect hydraulic fitting 118 which is well known in the art. Hydraulic hose 120 is also shown. Hydraulic pressure for the jack 100 can be supplied by any conventional hydraulic power supply (not shown).

By utilizing a hydraulic cylinder for the jack 100, the amount of preload applied to the anchor bolt repair coupling/failed anchor bolt assembly can be more precisely determined. Further, as will be appreciated by those of ordinary skill in the art, a hydraulic cylinder facilitates multiple applications of preload and the application of cyclic preload.

Multiple preloads may be applied in the following manner. After the first preload has been applied by jack 100, the engaging means 20 are activated to hold the grips 14 in position. The hydraulic pressure in the hydraulic cylinder can then be reduced to allow the anchor bolt repair coupling assembly to relax slightly. After a period of time, the preload can be reapplied by increasing the hydraulic pressure in the jack to the appropriate level. The engaging means can be further activated to ensure proper engagement. This sequence can be repeated until substantially all displacement is removed from the system and the anchor bolt repair coupling assembly is properly preloaded.

Cyclic preloading also can be accomplished by pulsing the hydraulic fluid in the jack 100. It is often preferable to have the cyclic preloads applied by the jack model the cyclic loads that are expected to be experienced by the anchor bolt repair system during normal use. During the cyclic application of preload in this manner, the engaging means 20 can be increasingly activated to ensure total engagement of the grips 14 with the failed anchor member 3.

It will be appreciated by those of skill in the art having benefit of this disclosure that a pneumatic jack will also perform well with this invention.

Numerous modifications and variations of the present invention are possible in light of the above disclosure. It is therefore to be understood that within the scope of the appended claims, the invention may be practiced otherwise than as specifically described herein:

What is claimed is:

1. A repair coupling for repairing a broken anchor bolt, which comprises:
   a coupling base having an internal wall defining an internal chamber opened at one end, and having a threaded portion at another end for receiving a threaded member;
   a plurality of grips each having a serrated face located in said internal chamber for gripping said broken anchor bolt;
   a preloading jack for preloading the repair coupling to a predetermined level, said preloading jack having a jacking surface; and
   engaging means for engaging the grips against said broken anchor bolt, at substantially said preloading level.

2. The repair coupling of claim 1 wherein the engaging means are threaded fasteners which engage the grips substantially parallel a the longitudinal axis of the anchor bolt.

3. The repair coupling of claim 1 wherein the grips are curved about an axis parallel to a longitudinal axis of the anchor bolt.

4. The repair coupling of claim 3 wherein the grips have a longitudinal notch for fracturing into several smaller grips.

5. The repair coupling of claim 1 wherein the engaging means are threaded fasteners which contact the grips substantially perpendicular to a longitudinal axis of the anchor bolt.

6. The repair coupling of claim 5 further comprising a threaded cap for positioning the grips on the anchor bolt.

7. The repair coupling of claim 1 wherein the external chamber defined by the internal wall of the coupling base is tapered with respect to a longitudinal axis of the anchor bolt such that movement of the repair coupling relative to the grips forces the grips into stronger gripping engagement with the anchor bolt.

8. The repair coupling of claim 1 further comprising a spacing means for locating the grips within the internal chamber.

9. The repair coupling of claim 1 further comprising an injector port in said coupling base for fluid communication between the internal chamber of said repair coupling and an outside surface of said repair coupling.

10. The repair coupling of claim 9 wherein the injector port further comprises a one-way valve for fluid communication only between the outside surface of said repair coupling and said internal chamber.

11. The repair coupling of claim 1 further comprising a sealing means for retarding leakage of fluid from the internal chamber of the anchor bolt repair coupling.

12. The repair coupling of claim 1 wherein the preloading jack is a removable threaded member with wrench lands adjacent one end and said jacking surface at an opposite end.

13. The repair coupling of claim 1 wherein the preloading jack is also the threaded member.

14. The repair coupling of claim 1 wherein the preloading jack is a hydraulic actuator with external threads for mating with said threaded portion of said coupling base and a movable piston with said jacking surface adjacent thereto.

15. A repair coupling for repairing a broken anchor member, which comprises:
    a coupling base having an outside surface, an internal wall defining an internal chamber open at one end, and a threaded receptacle at another end for receiving a first anchor member;
    a plurality of grips located in the chamber for gripping the broken anchor member;
    a spacing means for positioning the grips within the chamber; and
    a preloading jack for preloading the repair coupling to a predetermined level having a jacking surface and an external threaded portion capable of mating with the threaded receptacle of said coupling base.

16. The repair coupling of claim 15 further comprising means for engaging the grips against the broken anchor member.

17. The repair coupling of claim 16 wherein the engaging means are threaded fasteners which contact the grips substantially parallel to a longitudinal axis of the broken anchor member.

18. The repair coupling of claim 15 wherein the spacing means are springs.

19. The repair coupling of claim 15 further comprising an injector port in said coupling base for fluid communication between the internal chamber of said repair coupling and the outside surface of said repair coupling.

20. The repair coupling of claim 19 wherein the injector port further comprises a one-way valve for fluid communication only between the outside surface of said repair coupling and said internal chamber.

21. The repair coupling of claim 15 further comprising a sealing means for sealing the internal chamber against substantial fluid leakage.

22. The repair coupling of claim 15 wherein the preloading jack is a removable threaded member with wrench lands adjacent one end and said jacking surface at an opposite end.

23. The repair coupling of claim 15 wherein the preloading jack is also the first anchor member.

24. The repair coupling of claim 15 wherein the preloading jack is an hydraulic actuator with a movable piston with said jacking surface adjacent thereto.

25. A method for repairing a failed anchor member comprising the steps of:
    removing foundation surrounding the failed member to produce a repair region of sufficient depth to expose a portion of the failed member;
    removing all but a short stub of the exposed portion of the failed anchor member;
    installing upon the failed anchor member a repair coupling comprising a coupling base having an internal wall defining an internal chamber open at one end and having a threaded portion at another end for receiving a threaded member, a plurality of grips located in said internal chamber for gripping said failed anchor member, and a preloading jack having a jacking surface for applying a preload to the repair coupling to a predetermined level; and
    activating the preloading jack to preload said repair coupling to a predetermined level.

26. The method of claim 25 further comprising the step of
    activating a means for engaging the grips against the failed anchor member, said engaging means disposed in said repair coupling.

27. The method of claim 26 further comprising the steps of
    releasing the preload applied by said jack for a predetermined period of time;
    reactivating said jack to preload the repair coupling to a predetermined level; and further activating the engaging means.

28. The method of claim 25 further comprising the steps of
   removing said jack from said repair coupling;
   attaching a replacement anchor member to the repair coupling base; and
   filling in the repair region with foundation repair material.

29. The method of claim 25 further comprising the step of
   filling in the repair region with foundation repair material.

30. The method of claim 25 further comprising the step of injecting a hardening compound through an injector port in said coupling base into said internal chamber.

31. The method of claim 25 wherein the step of activating the jack comprises alternating the applied preload between a predetermined maximum and minimum load for a predetermined period of time.

* * * * *

UNITED STATES PATENT AND TRADEMARK OFFICE
CERTIFICATE OF CORRECTION

PATENT NO. : 5,393,165

DATED : February 28, 1995

INVENTOR(S) : Robert L. Rowan, Jr.

It is certified that error appears in the above-identified patent and that said Letters Patent is hereby corrected as shown below:

Column 9, claim 7, line 34, delete "external" and insert --internal--.

Column 9, claim 9, line 45, replace "the" with --an--.

Signed and Sealed this

Ninth Day of May, 1995

Attest:

BRUCE LEHMAN

Attesting Officer    Commissioner of Patents and Trademarks